(12) United States Patent
Fukuda

(10) Patent No.: US 12,056,875 B2
(45) Date of Patent: Aug. 6, 2024

(54) IMAGE PROCESSING DEVICE, LEARNING DEVICE, RADIOGRAPHY SYSTEM, IMAGE PROCESSING METHOD, LEARNING METHOD, IMAGE PROCESSING PROGRAM, AND LEARNING PROGRAM

(71) Applicant: FUJIFILM CORPORATION, Tokyo (JP)

(72) Inventor: Wataru Fukuda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 350 days.

(21) Appl. No.: 17/697,971

(22) Filed: Mar. 18, 2022

(65) Prior Publication Data

US 2022/0318998 A1    Oct. 6, 2022

(30) Foreign Application Priority Data

Mar. 30, 2021    (JP) ................................. 2021-058343

(51) Int. Cl.
*G06T 7/00*    (2017.01)
(52) U.S. Cl.
CPC .. *G06T 7/0012* (2013.01); *G06T 2207/10081* (2013.01); *G06T 2207/20081* (2013.01); *G06T 2207/30068* (2013.01)
(58) Field of Classification Search
None
See application file for complete search history.

(56) References Cited

U.S. PATENT DOCUMENTS

| 9,373,180 B2 * | 6/2016 | Batenburg | ............ G06T 11/005 |
| 2019/0139276 A1 * | 5/2019 | Lee | ........................ G06T 11/005 |
| 2019/0328348 A1 | 10/2019 | De Man et al. | |

FOREIGN PATENT DOCUMENTS

JP    2020-506742 A1    3/2020

* cited by examiner

*Primary Examiner* — Darryl V Dottin
(74) *Attorney, Agent, or Firm* — SOLARIS Intellectual Property Group, PLLC

(57) ABSTRACT

An image processing device generates a tomographic image group from a plurality of projection images, inputs the generated tomographic image group to a tomographic image estimation model, which is a trained model generated by performing machine learning on a machine learning model using learning data composed of a set of correct answer data that is three-dimensional data indicating a three-dimensional structure and of a virtual tomographic image group generated from a plurality of virtual projection images, onto which the three-dimensional structure has been projected by performing pseudo-projection on the three-dimensional structure with radiation at a plurality of virtual irradiation positions using the three-dimensional data, and which receives the tomographic image group as an input and outputs an estimated tomographic image group, and acquires the estimated tomographic image group output from the tomographic image estimation model.

15 Claims, 10 Drawing Sheets

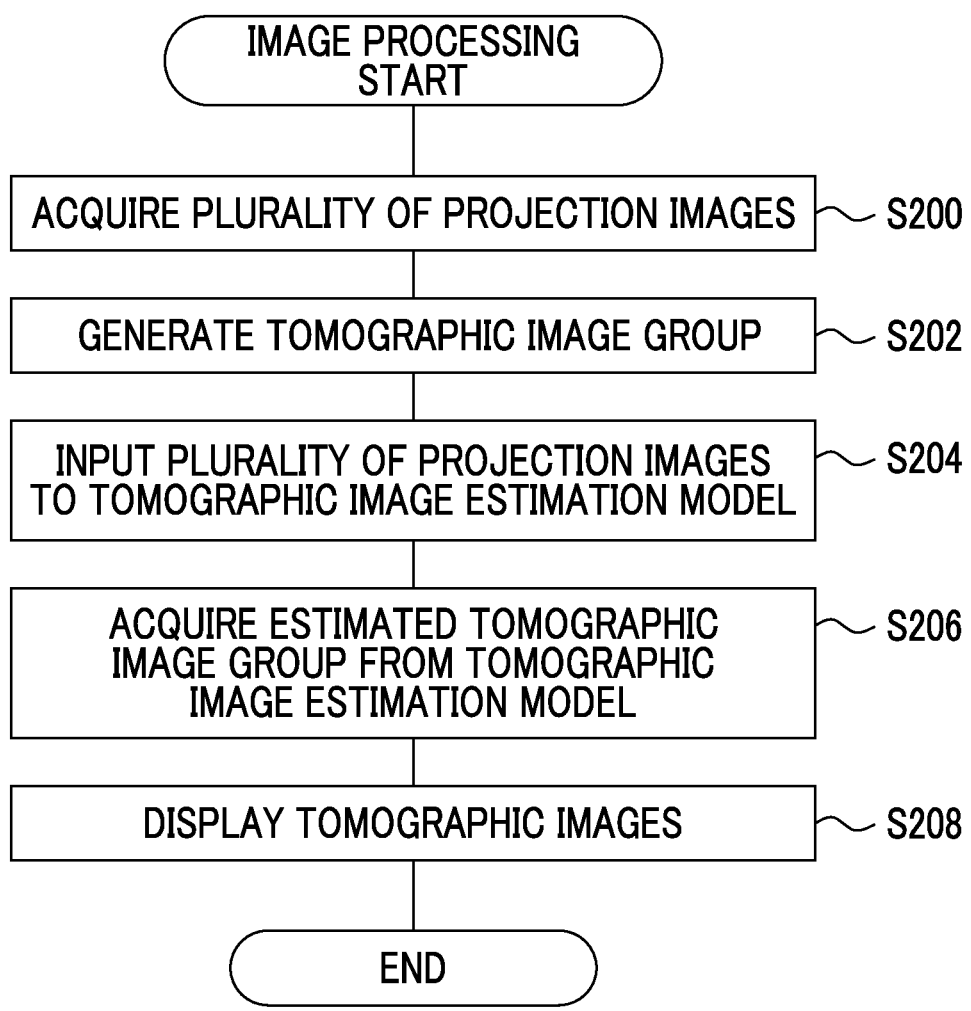

IMAGE PROCESSING DEVICE, LEARNING DEVICE, RADIOGRAPHY SYSTEM, IMAGE PROCESSING METHOD, LEARNING METHOD, IMAGE PROCESSING PROGRAM, AND LEARNING PROGRAM

CROSS-REFERENCE TO RELATED APPLICATIONS

The present application claims priority under 35 U.S.C. § 119 to Japanese Patent Application No. 2021-058343 filed on Mar. 30, 2021. The above application is hereby expressly incorporated by reference, in its entirety, into the present application.

BACKGROUND

1. Technical Field of the Invention

The present disclosure relates to an image processing device, a learning device, a radiography system, an image processing method, a learning method, an image processing program, and a learning program.

2. Description of the Related Art

So-called tomosynthesis imaging is known which irradiates an object with radiation at each of a plurality of irradiation positions having different irradiation angles to capture a plurality of projection images of the object at different irradiation positions. A technique is known which generates tomographic images from a plurality of projection images obtained by the tomosynthesis imaging.

In a case in which the number of projection images for generating the tomographic images is not sufficient, artifacts are likely to occur in the generated tomographic images. Therefore, there is a demand for a technique that obtains high-quality tomographic images even in a case in which the number of projection images is not sufficient. For example, JP2020-506742A discloses a technique that generates missing data using a trained neural network, which is a trained model, and that uses the generated data for reconstruction in a case in which a portion of projection data is damaged or missing.

SUMMARY

In the above-described technique according to the related art, a sufficient number of projection images without missing or damaged data are required to train the neural network. The above-described technique according to the related art is premised on computed tomography (CT), and a sufficient number of projection images are obtained in CT.

However, in radiography apparatuses that perform the tomosynthesis imaging, an irradiation angle range in which radiation is emitted is narrower than that in CT, and there is a problem in that it is difficult to prepare a sufficient number of projection images for training the trained model.

The present disclosure has been made in view of the above circumstances, and an object of the present disclosure is to provide an image processing device, a learning device, a radiography system, an image processing method, a learning method, an image processing program, and a learning program that can generate high-quality tomographic images using a trained model which has been trained by learning data corresponding to projection images obtained by tomosynthesis imaging.

In order to achieve the above object, according to a first aspect of the present disclosure, there is provided an image processing device that processes a plurality of projection images obtained by sequentially irradiating an object with radiation at each of a plurality of irradiation positions having different irradiation angles. The image processing device comprises at least one processor. The processor acquires the plurality of projection images, generates a tomographic image group indicating a plurality of tomographic planes of the object from the plurality of projection images, inputs the generated tomographic image group to a tomographic image estimation model, which is a trained model generated by performing machine learning on a machine learning model using learning data composed of a set of correct answer data that is three-dimensional data indicating a three-dimensional structure and of a virtual tomographic image group generated from a plurality of virtual projection images, onto which the three-dimensional structure has been projected by performing pseudo-projection on the three-dimensional structure with the radiation at a plurality of virtual irradiation positions using the three-dimensional data, and which receives the tomographic image group as an input and outputs an estimated tomographic image group, and acquires the estimated tomographic image group output from the tomographic image estimation model.

According to a second aspect of the present disclosure, in the image processing device according to the first aspect, the three-dimensional data which is the correct answer data may be image data indicating a plurality of correct answer tomographic images corresponding to different tomographic planes.

According to a third aspect of the present disclosure, in the image processing device according to the first aspect or the second aspect, the object may be a breast.

In order to achieve the above object, according to a fourth aspect of the present disclosure, there is provided a learning device comprising at least one processor. The processor performs pseudo-projection on a three-dimensional structure with radiation at a plurality of virtual irradiation positions, using three-dimensional data indicating the three-dimensional structure, to generate a plurality of virtual projection images onto which the three-dimensional structure has been projected, generates a virtual tomographic image group from the plurality of virtual projection images, and performs machine learning on a machine learning model, using learning data composed of a set of correct answer data which is the three-dimensional data and of the virtual tomographic image group, to generate a tomographic image estimation model that receives a tomographic image group as an input and outputs an estimated tomographic image group.

According to a fifth aspect of the present disclosure, in the learning device according to the fourth aspect, the processor may simulate attenuation of the radiation according to an absorption coefficient to generate the plurality of virtual projection images.

According to a sixth aspect of the present disclosure, in the learning device according to the fourth aspect or the fifth aspect, the three-dimensional data which is the correct answer data may be image data indicating a plurality of correct answer tomographic images corresponding to different tomographic planes.

According to a seventh aspect of the present disclosure, in the learning device according to any one of the fourth to sixth aspects, the processor may give a noise component corresponding to an arrival dose to a dose of the radiation assumed to reach a radiation detector, which generates projection images used to generate the tomographic images, to generate the plurality of virtual projection images.

According to an eighth aspect of the present disclosure, in the learning device according to any one of the fourth to seventh aspects, the processor may generate the virtual tomographic image group from the plurality of virtual projection images using an FBP method or an iterative reconstruction method.

According to a ninth aspect of the present disclosure, in the learning device according to any one of the fourth to eighth aspects, the plurality of virtual irradiation positions may be positions that simulate irradiation positions of the radiation in tomosynthesis imaging.

According to a tenth aspect of the present disclosure, in the learning device according to any one of the fourth to ninth aspects, the three-dimensional structure may be a structure indicating a breast, and the tomographic image group may be generated from projection images obtained by imaging the breast as an object.

Furthermore, in order to achieve the above object, according to an eleventh aspect of the present disclosure, there is provided a radiography system comprising: a radiation source that generates radiation; a radiography apparatus that performs tomosynthesis imaging which irradiates an object with the radiation at each of a plurality of irradiation positions having different irradiation angles to capture projection images of the object at each of the irradiation positions; the image processing device according to the present disclosure; and the learning device according to the present disclosure.

Further, in order to achieve the above object, according to a twelfth aspect of the present disclosure, there is provided an image processing method that is executed by a computer and that processes a plurality of projection images obtained by sequentially irradiating an object with radiation at each of a plurality of irradiation positions having different irradiation angles. The image processing method comprises: acquiring the plurality of projection images; generating a tomographic image group indicating a plurality of tomographic planes of the object from the plurality of projection images on the basis of the plurality of irradiation positions; inputting the generated tomographic image group to a tomographic image estimation model, which is a trained model generated by performing machine learning on a machine learning model using learning data composed of a set of correct answer data that is three-dimensional data indicating a three-dimensional structure and of a virtual tomographic image group generated from a plurality of virtual projection images, onto which the three-dimensional structure has been projected by performing pseudo-projection on the three-dimensional structure with the radiation at a plurality of virtual irradiation positions using the three-dimensional data, and which receives the tomographic image group as an input and outputs an estimated tomographic image group; and acquiring the estimated tomographic image group output from the tomographic image estimation model.

Furthermore, in order to achieve the above object, according to a thirteenth aspect of the present disclosure, there is provided a learning method that is executed by a computer. The learning method comprises: performing pseudo-projection on a three-dimensional structure with radiation at a plurality of virtual irradiation positions, using three-dimensional data indicating the three-dimensional structure, to generate a plurality of virtual projection images onto which the three-dimensional structure has been projected; generating a virtual tomographic image group from the plurality of virtual projection images using the plurality of virtual projection positions; and performing machine learning on a machine learning model, using learning data composed of a set of correct answer data which is the three-dimensional data and of the virtual tomographic image group, to generate a tomographic image estimation model that receives a tomographic image group as an input and outputs an estimated tomographic image group.

Moreover, in order to achieve the above object, according to a fourteenth aspect of the present disclosure, there is provided an image processing program that processes a plurality of projection images obtained by sequentially irradiating an object with radiation at each of a plurality of irradiation positions having different irradiation angles. The image processing program causes a computer to perform a process comprising: acquiring the plurality of projection images; generating a tomographic image group indicating a plurality of tomographic planes of the object from the plurality of projection images; inputting the generated tomographic image group to a tomographic image estimation model, which is a trained model generated by performing machine learning on a machine learning model using learning data composed of a set of correct answer data that is three-dimensional data indicating a three-dimensional structure and of a virtual tomographic image group generated from a plurality of virtual projection images, onto which the three-dimensional structure has been projected by performing pseudo-projection on the three-dimensional structure with the radiation at a plurality of virtual irradiation positions using the three-dimensional data, and which receives the tomographic image group as an input and outputs an estimated tomographic image group; and acquiring the estimated tomographic image group output from the tomographic image estimation model.

In addition, in order to achieve the above object, according to a fifteenth aspect of the present disclosure, there is provided a learning program that causes a computer to perform a process comprising: performing pseudo-projection on a three-dimensional structure with radiation at a plurality of virtual irradiation positions, using three-dimensional data indicating the three-dimensional structure, to generate a plurality of virtual projection images onto which the three-dimensional structure has been projected; generating a virtual tomographic image group from the plurality of virtual projection images; and performing machine learning on a machine learning model, using learning data composed of a set of correct answer data which is the three-dimensional data and of the virtual tomographic image group, to generate a tomographic image estimation model that receives a tomographic image group as an input and outputs an estimated tomographic image group.

According to the present disclosure, it is possible to generate high-quality tomographic images using a trained model that has been trained by learning data corresponding to projection images obtained by tomosynthesis imaging.

BRIEF DESCRIPTION OF THE DRAWINGS

Exemplary embodiments according to the technique of the present disclosure will be described in detail based on the following figures, wherein:

FIG. 11 is a flowchart illustrating an example of a flow of image processing by the console according to the embodiment.

DETAILED DESCRIPTION

Hereinafter, an embodiment of the present disclosure will be described in detail with reference to the drawings. In addition, this embodiment does not limit the present disclosure.

Figure 1:
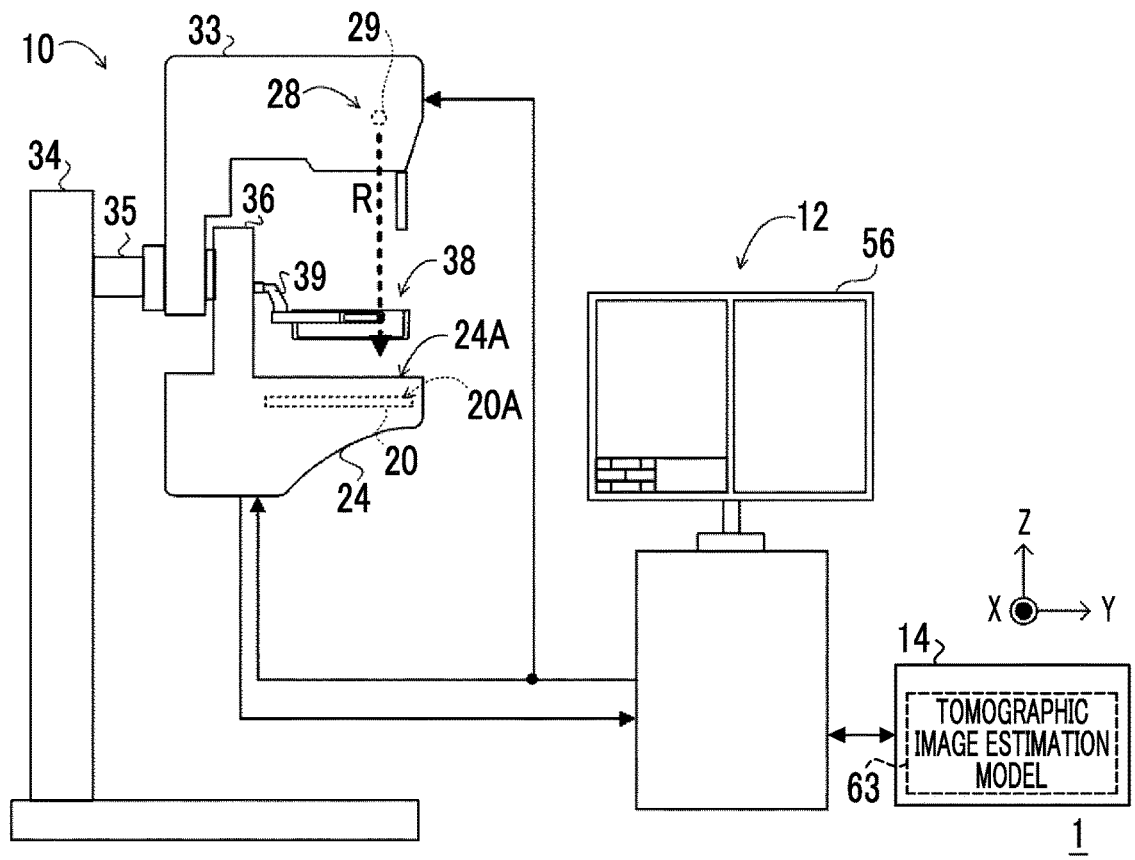
FIG. 1 is a diagram schematically illustrating an example of an overall configuration of a radiography system according to an embodiment.

First, an example of an overall configuration of a radiography system according to an embodiment will be described. FIG. 1 is a diagram illustrating an example of the overall configuration of a radiography system 1 according to this embodiment. As illustrated in FIG. 1, the radiography system 1 according to this embodiment comprises a mammography apparatus 10, a console 12, and a support device 14.

First, the mammography apparatus 10 according to this embodiment will be described. FIG. 1 is a side view illustrating an example of an outward appearance of the mammography apparatus 10 according to this embodiment. In addition, FIG. 1 illustrates an example of the outward appearance of the mammography apparatus 10 as viewed from a left side of a subject.

The mammography apparatus 10 according to this embodiment is an apparatus that is operated under control of the console 12 and that irradiates a breast of the subject as an object with radiation R (for example, X-rays) to capture a radiographic image of the breast. In addition, the mammography apparatus 10 may be an apparatus that images the breast of the subject not only in a state in which the subject is standing (standing state) but also in a state in which the subject is sitting on, for example, a chair (including a wheelchair) (sitting state).

Furthermore, the mammography apparatus 10 according to this embodiment has a function of performing normal imaging that captures images at an irradiation position where a radiation source 29 is disposed along a normal direction to a detection surface 20A of a radiation detector 20 and so-called tomosynthesis imaging that captures images while moving the radiation source 29 to each of a plurality of irradiation positions.

The radiation detector 20 detects the radiation R transmitted through the breast which is the object. Specifically, the radiation detector 20 detects the radiation R that has entered the breast of the subject and an imaging table 24 and that has reached the detection surface 20A of the radiation detector 20, generates a radiographic image on the basis of the detected radiation R, and outputs image data indicating the generated radiographic image. In the following description, in some cases, a series of operations of emitting the radiation R from the radiation source 29 and generating a radiographic image using the radiation detector 20 is referred to as "imaging". On the detection surface 20A of the radiation detector 20 according to this embodiment, i pixels (see pixels $21_i$ (i=1, 2, . . . ,) in FIG. 7) corresponding to the radiographic image generated by the radiation detector 20 are disposed in a matrix. The type of the radiation detector 20 according to this embodiment is not particularly limited. For example, the radiation detector 20 may be an indirect-conversion-type radiation detector that converts the radiation R into light and converts the converted light into charge or may be a direct-conversion-type radiation detector that directly converts the radiation R into charge.

As illustrated in FIG. 1, the radiation detector 20 is disposed in the imaging table 24. In the mammography apparatus 10 according to this embodiment, in a case in which imaging is performed, the breast of the subject is positioned on an imaging surface 24A of the imaging table 24 by a user.

A compression plate 38 that is used to compress the breast in a case in which imaging is performed is attached to a compression unit 36 that is provided in the imaging table 24. Specifically, the compression unit 36 is provided with a compression plate driving unit (not illustrated) that moves the compression plate 38 in a direction (hereinafter, referred to as an "up-down direction") toward or away from the imaging table 24. A support portion 39 of the compression plate 38 is detachably attached to the compression plate driving unit and is moved in the up-down direction by the compression plate driving unit to compress the breast of the subject between the compression plate 38 and the imaging table 24. The compression plate 38 according to this embodiment is an example of a compression member according to the present disclosure.

As illustrated in FIG. 1, the mammography apparatus 10 according to this embodiment comprises the imaging table 24, an arm portion 33, a base 34, and a shaft portion 35. The arm portion 33 is held by the base 34 to be movable in the up-down direction (Z-axis direction). In addition, the arm portion 33 can be rotated with respect to the base 34 by the shaft portion 35. The shaft portion 35 is fixed to the base 34, and the shaft portion 35 and the arm portion 33 are rotated integrally.

Gears are provided in each of the shaft portion 35 and the compression unit 36 of the imaging table 24. The gears can be switched between an engaged state and a non-engaged state to switch between a state in which the compression unit 36 of the imaging table 24 and the shaft portion 35 are connected and rotated integrally and a state in which the shaft portion 35 is separated from the imaging table 24 and runs idle. In addition, components for switching between transmission and non-transmission of power of the shaft portion 35 are not limited to the gears, and various mechanical elements may be used.

Each of the arm portion 33 and the imaging table 24 can be relatively rotated with respect to the base 34, using the shaft portion 35 as a rotation axis. In this embodiment, engagement portions (not illustrated) are provided in each of the base 34, the arm portion 33, and the compression unit 36 of the imaging table 24. The state of the engagement portions is switched to connect each of the arm portion 33 and the compression unit 36 of the imaging table 24 to the base 34. One or both of the arm portion 33 and the imaging table 24 connected to the shaft portion 35 are integrally rotated on the shaft portion 35.

Figure 2:
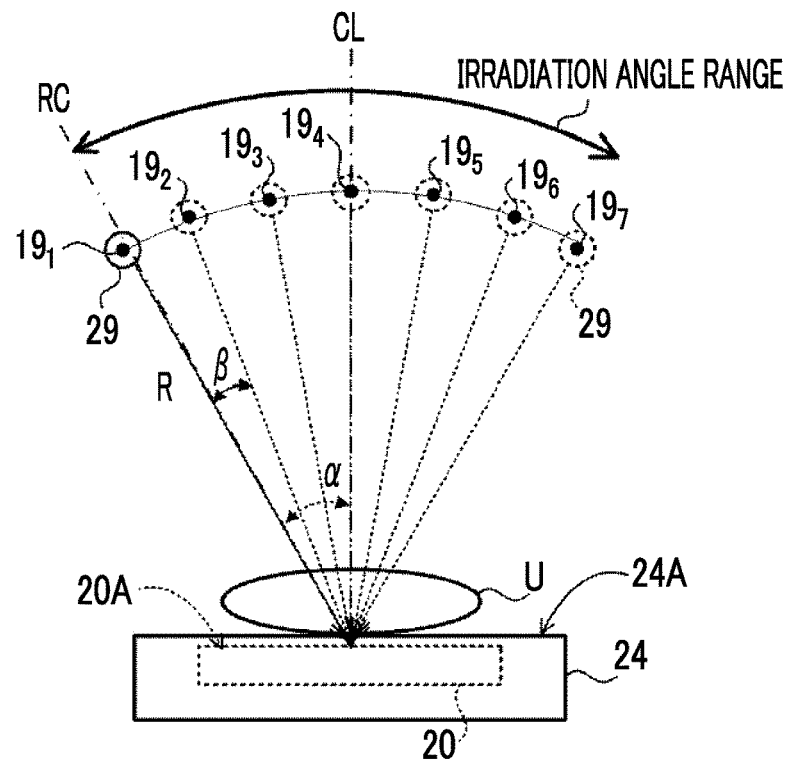
FIG. 2 is a diagram illustrating an example of tomosynthesis imaging.

In a case in which the mammography apparatus 10 performs the tomosynthesis imaging, the radiation source 29 of a radiation emitting unit 28 is sequentially moved to each of the plurality of irradiation positions having different irradiation angles by the rotation of the arm portion 33. The radiation source 29 includes a radiation tube (not illustrated) that generates the radiation R, and the radiation tube is moved to each of the plurality of irradiation positions according to the movement of the radiation source 29. FIG. 2 is a diagram illustrating an example of the tomosynthesis imaging. In addition, the compression plate 38 is not illustrated in FIG. 2. In this embodiment, as illustrated in FIG. 2, the radiation source 29 is moved to irradiation positions $19_t$ (t=1, 2, . . . ; the maximum value is 7 in FIG. 2) having different irradiation angles which are arranged at an interval of a predetermined angle β, that is, positions where the radiation R is emitted to the detection surface 20A of the radiation detector 20 at different angles. At each of the irradiation positions $19_t$, the radiation source 29 emits the radiation R to an object U in response to an instruction from the console 12, and the radiation detector 20 captures a radiographic image. In the radiography system 1, in a case in which the tomosynthesis imaging that moves the radiation source 29 to each of the irradiation positions $19_t$ and captures radiographic images at each of the irradiation positions $19_t$ is performed, seven radiographic images are obtained in the example illustrated in FIG. 2. In addition, in the following description, in the tomosynthesis imaging, in a case in which a radiographic image captured at each irradiation position 19 is distinguished from other radiographic images, it is referred to as a "projection image". Further, in a case in which a radiographic image is generically referred to regardless of the type, such as a projection image and a tomographic image which will be described below, it is simply referred to as a "radiographic image". Further, in the following description, for the image corresponding to the irradiation position $19_t$, such as the projection image captured at each irradiation position $19_t$, the reference letter t indicating the irradiation position $19_t$ is given to the reference numeral indicating each image.

In addition, as illustrated in FIG. 2, the irradiation angle of the radiation R means an angle α formed between a normal line CL to the detection surface 20A of the radiation detector 20 and a radiation axis RC. The radiation axis RC means an axis that connects a focus of the radiation source 29 at each irradiation position 19 and a preset position such as a center of the detection surface 20A. Further, here, it is assumed that the detection surface 20A of the radiation detector 20 is substantially parallel to the imaging surface 24A. Hereinafter, a predetermined range in which the irradiation angles are different in the tomosynthesis imaging as illustrated in FIG. 2 is referred to as an "irradiation angle range".

Moreover, in a case in which the mammography apparatus 10 performs the normal imaging, the radiation source 29 of the radiation emitting unit 28 remains at the irradiation position $19_t$ (the irradiation position $19_t$ along the normal direction, the irradiation position $19_4$ in FIG. 2) where the irradiation angle α is 0 degrees. The radiation source 29 emits the radiation R in response to an instruction from the console 12, and the radiation detector 20 captures a radiographic image.

Figure 3:
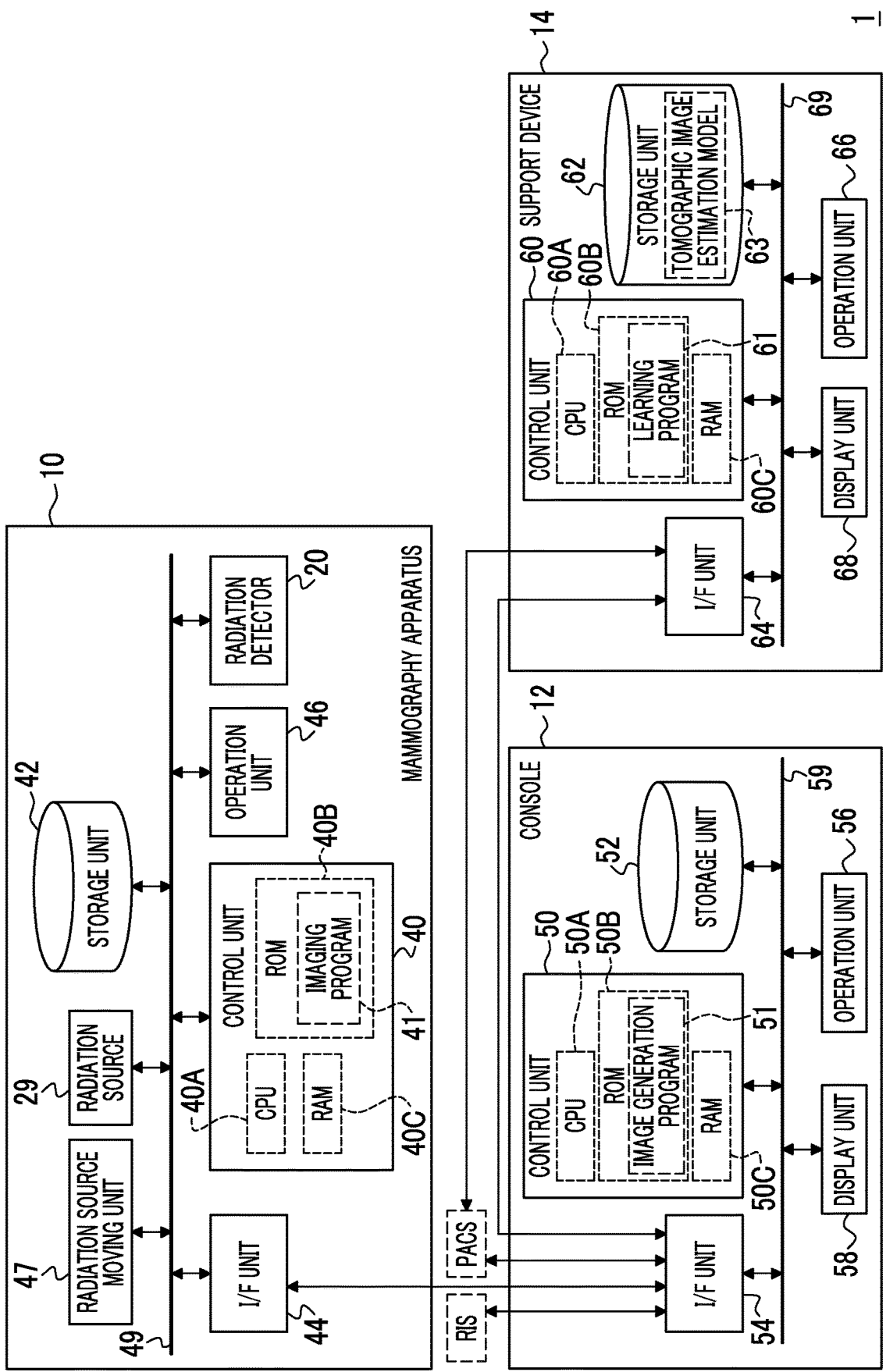
FIG. 3 is a block diagram illustrating an example of a configuration of a mammography apparatus, a console, and a support device according to the embodiment.

Further, FIG. 3 is a block diagram illustrating an example of the configuration of the mammography apparatus 10, the console 12, and the support device 14 according to the embodiment. As illustrated in FIG. 3, the mammography apparatus 10 according to this embodiment further comprises a control unit 40, a storage unit 42, an interface (I/F) unit 44, an operation unit 46, and a radiation source moving unit 47. The control unit 40, the storage unit 42, the I/F unit 44, the operation unit 46, and the radiation source moving unit 47 are connected to each other through a bus 49, such as a system bus or a control bus, such that they can transmit and receive various kinds of information.

The control unit 40 controls the overall operation of the mammography apparatus 10 under the control of the console 12. The control unit 40 comprises a central processing unit (CPU) 40A, a read only memory (ROM) 40B, and a random access memory (RAM) 40C. For example, various programs including an imaging program 41 which is executed by the CPU 40A and performs control related to the capture of a radiographic image are stored in the ROM 40B in advance. The RAM 40C temporarily stores various kinds of data.

For example, image data of a radiographic image captured by the radiation detector 20 and various other kinds of information are stored in the storage unit 42. A specific example of the storage unit 42 is a hard disk drive (HDD), a solid state drive (SSD), or the like. The I/F unit 44 transmits and receives various kinds of information to and from the console 12 using wireless communication or wired communication. The image data of the radiographic image captured by the radiation detector 20 in the mammography apparatus 10 is transmitted to the console 12 through the I/F unit 44 by wireless communication or wired communication.

Each of the control unit 40, the storage unit 42, and the I/F unit 44 according to this embodiment is provided in the imaging table 24.

In addition, the operation unit 46 is provided as a plurality of switches in, for example, the imaging table 24 of the mammography apparatus 10. Further, the operation unit 46 may be provided as a touch panel switch or may be provided as a foot switch that is operated by the feet of the user such as a doctor or a radiology technician.

The radiation source moving unit 47 has a function of moving the radiation source 29 to each of the plurality of irradiation positions $19_t$ under the control of the control unit 40 in a case in which the tomosynthesis imaging is performed as described above. Specifically, the radiation source moving unit 47 rotates the arm portion 33 with respect to the imaging table 24 to move the radiation source 29 to each of the plurality of irradiation positions $19_t$. The radiation source moving unit 47 according to this embodiment is provided inside the arm portion 33.

Further, the support device 14 according to this embodiment has a function of supporting image processing in the console 12.

For example, the support device 14 according to this embodiment is a server computer. As illustrated in FIG. 3, the support device 14 comprises a control unit 60, a storage unit 62, an I/F unit 64, an operation unit 66, and a display unit 68. The control unit 60, the storage unit 62, the I/F unit 64, the operation unit 66, and the display unit 68 are connected to each other through a bus 69, such as a system bus or a control bus, such that they can transmit and receive various kinds of information.

The control unit 60 according to this embodiment controls the overall operation of the support device 14. The control unit 60 comprises a CPU 60A, a ROM 60B, and a RAM 60C. For example, various programs including a learning program 61 executed by the CPU 60A are stored in the ROM 60B in advance. The RAM 60C temporarily stores various kinds of data. The support device 14 according to this embodiment is an example of a learning device according to the present disclosure, and the CPU 60A according to this embodiment is an example of a processor in the learning device according to the present disclosure. In addition, the learning program 61 according to this embodiment is an example of a learning program according to the present disclosure.

For example, various kinds of information including a tomographic image estimation model 63, which will be described in detail below, is stored in the storage unit 62. A specific example of the storage unit 62 is an HDD, an SSD, or the like.

The operation unit 66 is used by the user to input, for example, instructions or various kinds of information related to, for example, the generation of the tomographic image estimation model 63. The operation unit 66 is not particularly limited. Examples of the operation unit 66 include various switches, a touch panel, a touch pen, and a mouse. The display unit 68 displays various kinds of information. In addition, the operation unit 66 and the display unit 68 may be integrated into a touch panel display.

The I/F unit 64 transmits and receives various kinds of information to and from the console 12 and a picture archiving and communication system (PACS) using wireless communication or wired communication. In the radiography system 1 according to this embodiment, the console 12 receives the image data of the radiographic image captured by the mammography apparatus 10 from the mammography apparatus 10 through an I/F unit 54, using wireless communication or wired communication.

The function of the support device 14 according to this embodiment in supporting the image processing in the console 12 will be described. The support device 14 according to this embodiment has a function of supporting the image processing by the console 12. Specifically, the support device 14 has a function of generating the tomographic image estimation model 63 that is used by the console 12 to generate tomographic images in the image processing.

Figure 4:
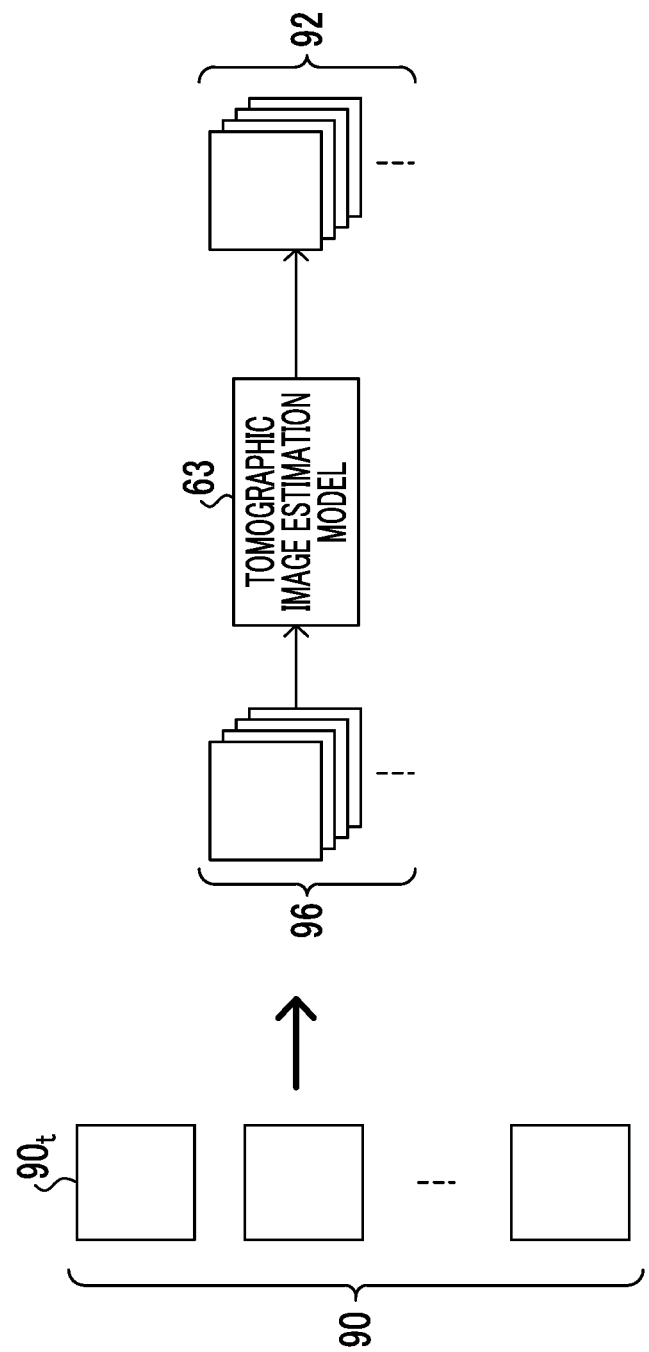
FIG. 4 is a diagram illustrating an operation phase of a tomographic image estimation model.

The tomographic image estimation model 63 is, for example, a tomographic image estimation algorithm using deep learning. For example, a tomographic image estimation model configured by a regional CNN (R-CNN) which is a kind of convolutional neural network (CNN), U-net which is a kind of fully convolutional network (FCN), or the like can be used as the tomographic image estimation model 63. As illustrated in FIG. 4, the tomographic image estimation model 63 receives a tomographic image group 96 generated from a plurality of projection images 90 obtained in the tomosynthesis imaging as an input and outputs an estimated tomographic image group 92 obtained by estimating a plurality of tomographic images generated from the plurality of projection images 90 using the irradiation positions $19_r$.

Figure 5:
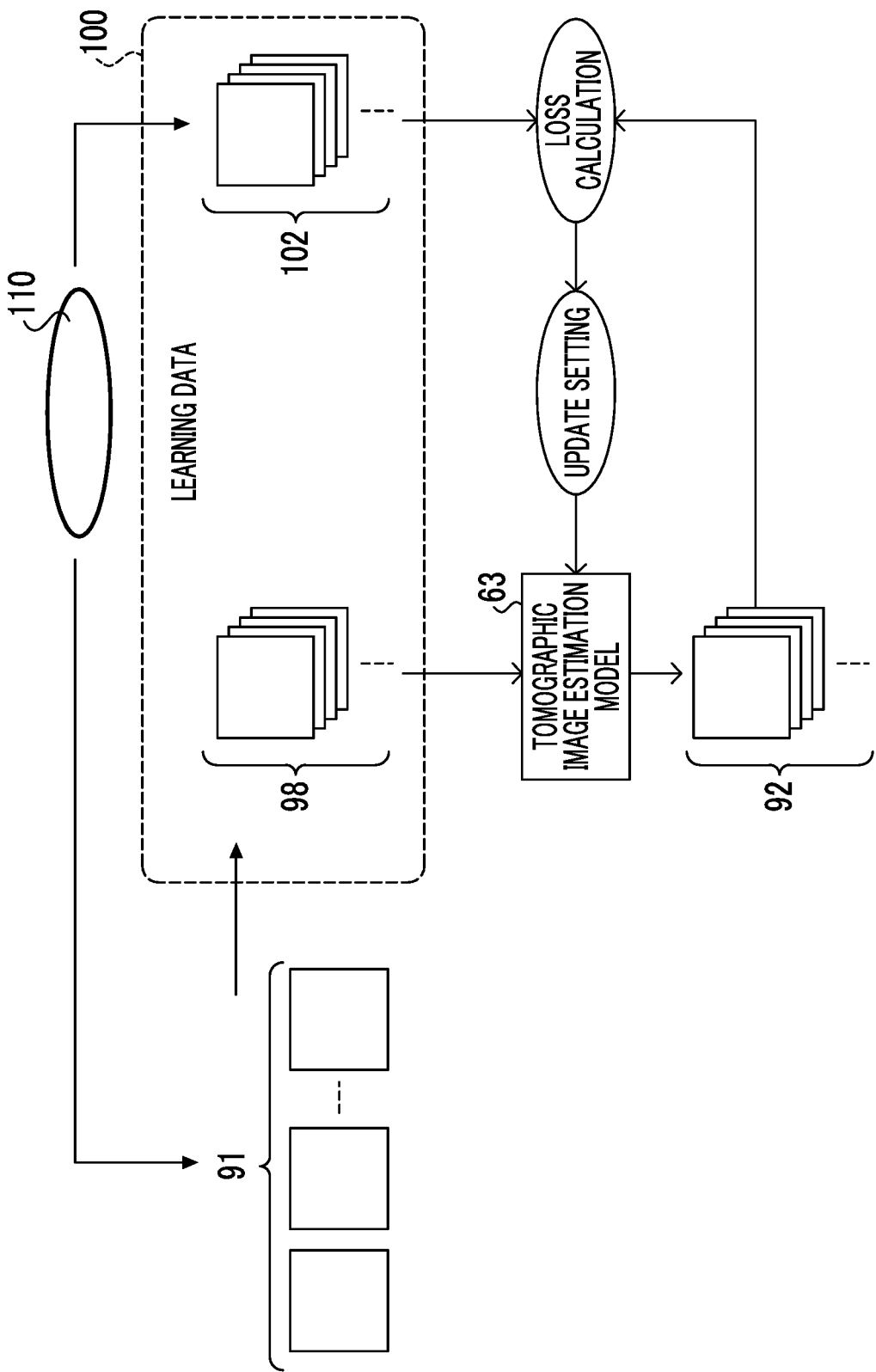
FIG. 5 is a diagram illustrating a learning phase of the tomographic image estimation model.

As illustrated in FIG. 5, the tomographic image estimation model 63 is a trained model that is generated by performing machine learning on a machine learning model using learning data 100 composed of a set of correct answer data 102 and of a virtual tomographic image group 98.

An example of a learning phase in which the tomographic image estimation model 63 is trained by machine learning will be described with reference to FIG. 5. The tomographic image estimation model 63 is trained by the learning data 100. The learning data 100 is composed of a set of the virtual tomographic image group 98 generated from the virtual projection images 91 and of the correct answer data 102. The correct answer data 102 is three-dimensional data indicating a three-dimensional structure 110 of the breast and is image data indicating a plurality of correct answer tomographic images corresponding to different tomographic planes. In addition, the slice thickness of the correct answer tomographic images which are the correct answer data 102, that is, the height of each of the tomographic planes of the correct answer tomographic images, can have any value.

The correct answer data 102 is preferably sinograms obtained in an irradiation angle range wider than the irradiation angle range of the tomosynthesis imaging and is more preferably complete sinograms obtained by imaging the object. For example, in this embodiment, computed tomography (CT) images which are a plurality of tomographic images of the object obtained by CT are used as the correct answer data 102. The virtual projection images 91 are a plurality of projection images which are virtually obtained and onto which the three-dimensional structure 110 has been projected by performing pseudo-projection on the three-dimensional structure 110 of the breast with the radiation R at a plurality of virtual irradiation positions.

In the learning phase, the virtual tomographic image group 98 of the learning data 100 is input to the tomographic image estimation model 63. The tomographic image estimation model 63 outputs the estimated tomographic image group 92 corresponding to the virtual tomographic image group 98. Loss calculation using a loss function is performed on the basis of the estimated tomographic image group 92 and the correct answer data 102. Then, an update of various coefficients of the tomographic image estimation model 63 is set according to the result of the loss calculation, and the tomographic image estimation model 63 whose update has been set is updated.

In the learning phase, a series of processes of the input of the virtual tomographic image group 98 of the learning data 100 to the tomographic image estimation model 63, the output of the estimated tomographic image group 92 from the tomographic image estimation model 63, the loss calculation based on the estimated tomographic image group 92 and the correct answer data 102, the setting of the update, and the update of the tomographic image estimation model 63 is repeated.

Figure 6:
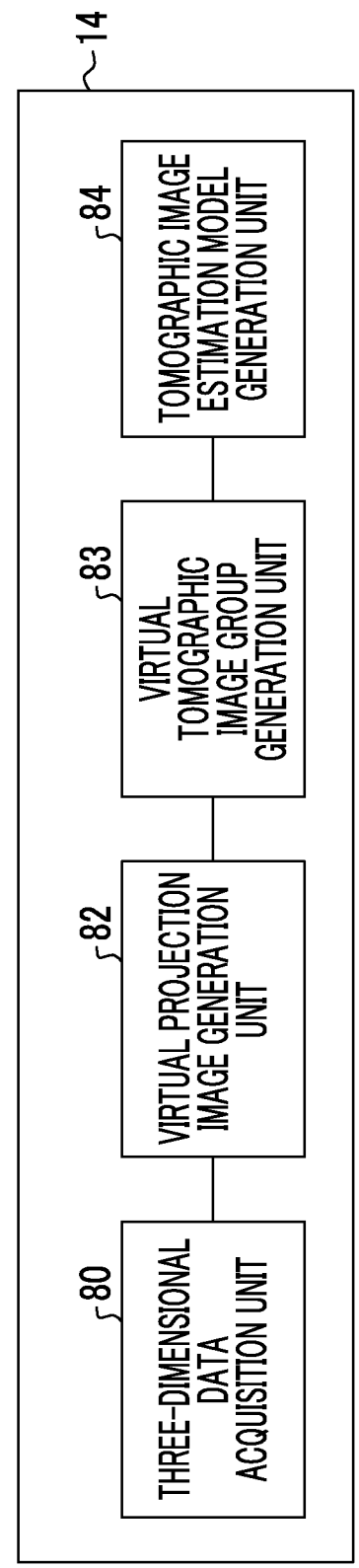
FIG. 6 is a functional block diagram illustrating an example of functions of the support device according to the embodiment.

FIG. 6 is a functional block diagram illustrating an example of a configuration related to the function of the support device 14 according to this embodiment in generating the tomographic image estimation model 63. As illustrated in FIG. 6, the support device 14 comprises a three-dimensional data acquisition unit 80, a virtual projection image generation unit 82, a virtual tomographic image group generation unit 83, and a tomographic image estimation model generation unit 84. For example, in the support device 14 according to this embodiment, the CPU 60A of the control unit 60 executes the learning program 61 stored in the ROM 60B to function as the three-dimensional data acquisition unit 80, the virtual projection image generation unit 82, the virtual tomographic image group generation unit 83, and the tomographic image estimation model generation unit 84.

The three-dimensional data acquisition unit 80 has a function of acquiring three-dimensional data used as the correct answer data 102. As described above, in this embodiment, since CT images are used as the correct answer data 102, the three-dimensional data acquisition unit 80 acquires a plurality of CT images indicating a plurality of tomographic planes of the breast. Specifically, the three-dimensional data acquisition unit 80 according to this embodiment acquires, as the three-dimensional data, image data indicating a plurality of CT images obtained by performing CT imaging on the three-dimensional structure 110 of the breast. In addition, the acquisition destination of the three-dimensional data is not particularly limited. For example, the three-dimensional data acquisition unit 80 may acquire the CT images of the breast as the three-dimensional data from the PACS. Further, for example, the three-dimensional data acquisition unit 80 may acquire, as the three-dimensional data, the CT images of the breast from a CT imaging apparatus (not illustrated) outside the radiography system 1. The three-dimensional data acquisition unit 80 outputs the acquired image data indicating the plurality of tomographic images to the virtual projection image generation unit 82.

The virtual projection image generation unit 82 has a function of performing pseudo-projection on the three-dimensional structure 110 with the radiation R at a plurality of virtual irradiation positions, using the three-dimensional data acquired by the three-dimensional data acquisition unit 80, to generate a plurality of virtual projection images 91 onto which the three-dimensional structure 110 has been projected.

As described above, the three-dimensional data according to this embodiment is CT images. Therefore, the virtual projection image generation unit 82 performs pseudo-projection on the three-dimensional structure 110 with the radiation R at a plurality of virtual irradiation positions, using the CT images, to generate a plurality of virtual projection images 91 onto which the three-dimensional structure 110 has been projected. The plurality of virtual irradiation positions used to generate the virtual projection images 91 are positions that simulate the irradiation positions $19_r$ of the radiation in the tomosynthesis imaging. For example, in this embodiment, the virtual irradiation positions are the same as the irradiation positions $19_r$.

A pixel value of the CT image corresponds to an absorption coefficient corresponding to the energy of the radiation used for imaging. The absorption coefficient of radiation in the capture of the CT image and the absorption coefficient of the radiation R in the tomosynthesis imaging are generally different from each other. Therefore, for example, the virtual projection image generation unit 82 according to this embodiment corrects the pixel value of the CT image to an absorption coefficient corresponding to the energy of the radiation R in the tomosynthesis imaging and performs reprojection at a plurality of virtual irradiation positions $19_r$ to generate a plurality of virtual projection images 91.

Figure 7:
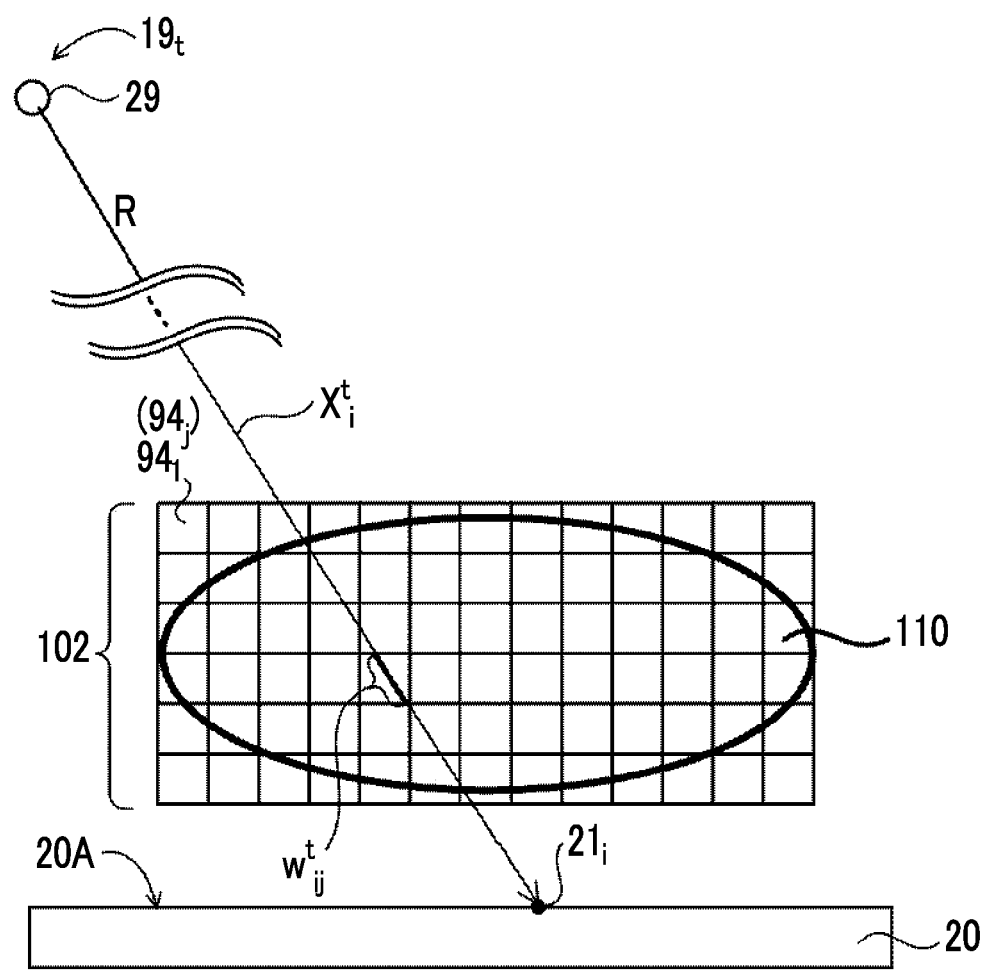
FIG. 7 is a diagram illustrating an example of a reprojection method in a virtual projection image generation unit of the support device.

An example of a reprojection method in the virtual projection image generation unit 82 will be described with reference to FIG. 7. As illustrated in FIG. 7, a plurality of voxels $94_j$ (j=1, 2, ..., J) are virtually set for the three-dimensional structure 110. The plurality of voxels $94_j$ are set according to, for example, the slice thickness of the CT images. FIG. 7 illustrates a path $X^r_i$ of the radiation R emitted from the radiation source 29 that is located at the irradiation position $19_r$ to a pixel $21_i$ of the radiation detector 20. Assuming that an intersection length of each voxel $94_j$ in a case in which the path $X^r_i$ intersects each voxel $94_j$ of the three-dimensional structure 110 is $w^r_{ij}$ and the absorption coefficient of each voxel $94_j$ is $\mu=\mu_1, \mu_2, ..., \mu_J$), in a case in which the radiation R is emitted at the irradiation position $19_r$, the number of photons $p^r_i$ detected by the i-th pixel $21_i$ of the radiation detector 20 is represented by the following Expression (1) based on radiation attenuation corresponding to the absorption coefficient.

$$p^r_i = b^r_i \exp\left(-\sum_j w^r_{ij}\mu_j\right) \quad (1)$$

The virtual projection image generation unit 82 derives the number of photons $p^r_i$ of each pixel $21_i$ of the radiation detector 20 at each virtual irradiation position $19_r$ via a simulation using the above-described Expression (1) to generate projection images $90_r$.

In addition, it is preferable that the virtual projection image generation unit 82 generates the virtual projection images 91 in consideration of noise corresponding to the radiation R actually emitted in the tomosynthesis imaging.

For example, it is known that the generation of the radiation R follows a Poisson distribution. Therefore, the virtual projection image generation unit 82 may give a noise component corresponding to an arrival dose to a dose of the radiation R assumed to reach the radiation detector 20 to generate the virtual projection images 91 in consideration of noise.

Further, it is preferable that the virtual projection image generation unit 82 generates the virtual projection images 91 in consideration of scattered rays generated in the tomosynthesis imaging. For example, the virtual projection image generation unit 82 may give scattered ray components of the radiation R, which has been emitted at the virtual irradiation positions $19_r$ and transmitted through the object, to the virtual projection images 91 obtained by the above-described Expression (1) to generate the virtual projection images 91 in consideration of the scattered rays. The scattered ray component can be derived, for example, by a simulation based on a convolution kernel or a Monte Carlo simulation that indicates scattering characteristics corresponding to the thickness of the three-dimensional structure 110 in the direction in which the radiation R is transmitted, that is, the thickness of the object.

In addition, it is preferable that the virtual projection image generation unit 82 reflects imaging conditions in the tomosynthesis imaging to generate the virtual projection images 91. For example, it is preferable to reflect an energy distribution in the tomosynthesis imaging. The energy distribution of the radiation R emitted is determined by an anode of the radiation source 29 and a filter (which are not illustrated) used in the tomosynthesis imaging. Therefore, it is preferable that the virtual projection image generation unit 82 derives the dose of the radiation transmitted from the energy distribution determined according to the imaging conditions and the radiation energy dependence of the absorption coefficient.

The virtual projection image generation unit 82 outputs image data indicating the generated plurality of virtual projection images 91 to the virtual tomographic image group generation unit 83.

The virtual tomographic image group generation unit 83 has a function of generating the virtual tomographic image group 98 from the plurality of virtual projection images 91 generated by the virtual projection image generation unit 82 using a plurality of virtual irradiation positions $19_r$. A method by which the virtual tomographic image group generation unit 83 generates the virtual tomographic image group 98 is not particularly limited, and a known method can be used. For example, reconstruction may be performed by a back projection method, such as a filter back projection (FBP) method or an iterative reconstruction method, or a known technique may be applied. In addition, in a case in which the FBP method is used, it is possible to shorten the time required for processing calculation. On the other hand, in a case in which the iterative reconstruction method is used, the virtual tomographic image group 98 with less noise and fewer artifacts is obtained. In the learning phase, the time required for the processing calculation may be longer than that in the operation phase. Therefore, it is preferable to perform reconstruction using the iterative reconstruction method, and it is possible to improve the quality of the virtual tomographic image group 98. The slice thickness of the virtual tomographic image group 98 generated by the virtual tomographic image group generation unit 83, that is, the height of each tomographic plane of the virtual tomographic image group 98, is not particularly limited and can have any value. It is preferable that the slice thickness of the virtual tomographic image group 98 is equal to the slice thickness of the correct answer tomographic images which are the correct answer data 102.

The virtual tomographic image group generation unit 83 outputs image data indicating the generated virtual tomographic image group 98 to the tomographic image estimation model generation unit 84.

The tomographic image estimation model generation unit 84 has a function of performing machine learning on a machine learning model, using the learning data 100 composed of a set of the correct answer data 102 and of the virtual tomographic image group 98, to generate the tomographic image estimation model 63 that receives the tomographic image group 96 as an input and outputs the estimated tomographic image group 92.

First, the tomographic image estimation model generation unit 84 prepares the learning data 100. As described above, the absorption coefficient of radiation in the CT imaging and the absorption coefficient of the radiation R in the tomosynthesis imaging are different from each other. Therefore, the CT image and the radiographic image captured by the mammography apparatus 10 look different. Specifically, even in images indicating the tomographic planes of the same breast, the CT images and the tomographic images generated from the projection images obtained by the tomosynthesis imaging by the mammography apparatus 10 look different because the absorption coefficients in imaging are different from each other.

For this reason, in this embodiment, the CT image, which is the three-dimensional data acquired by the three-dimensional data acquisition unit 80, is not used as the correct answer data 102, but an image obtained by correcting the CT image according to the absorption coefficient of the radiographic image is used as the correct answer data 102. Therefore, the tomographic image estimation model generation unit 84 corrects the pixel value of the CT image, which is the three-dimensional data acquired by the three-dimensional data acquisition unit 80, to an absorption coefficient corresponding to the energy of the radiation R in the tomosynthesis imaging to generate the correct answer data 102. The tomographic image estimation model generation unit 84 uses a set of the virtual tomographic image group 98 generated by the virtual tomographic image group generation unit 83 and the correct answer data 102 as the learning data 100.

Figure 8:
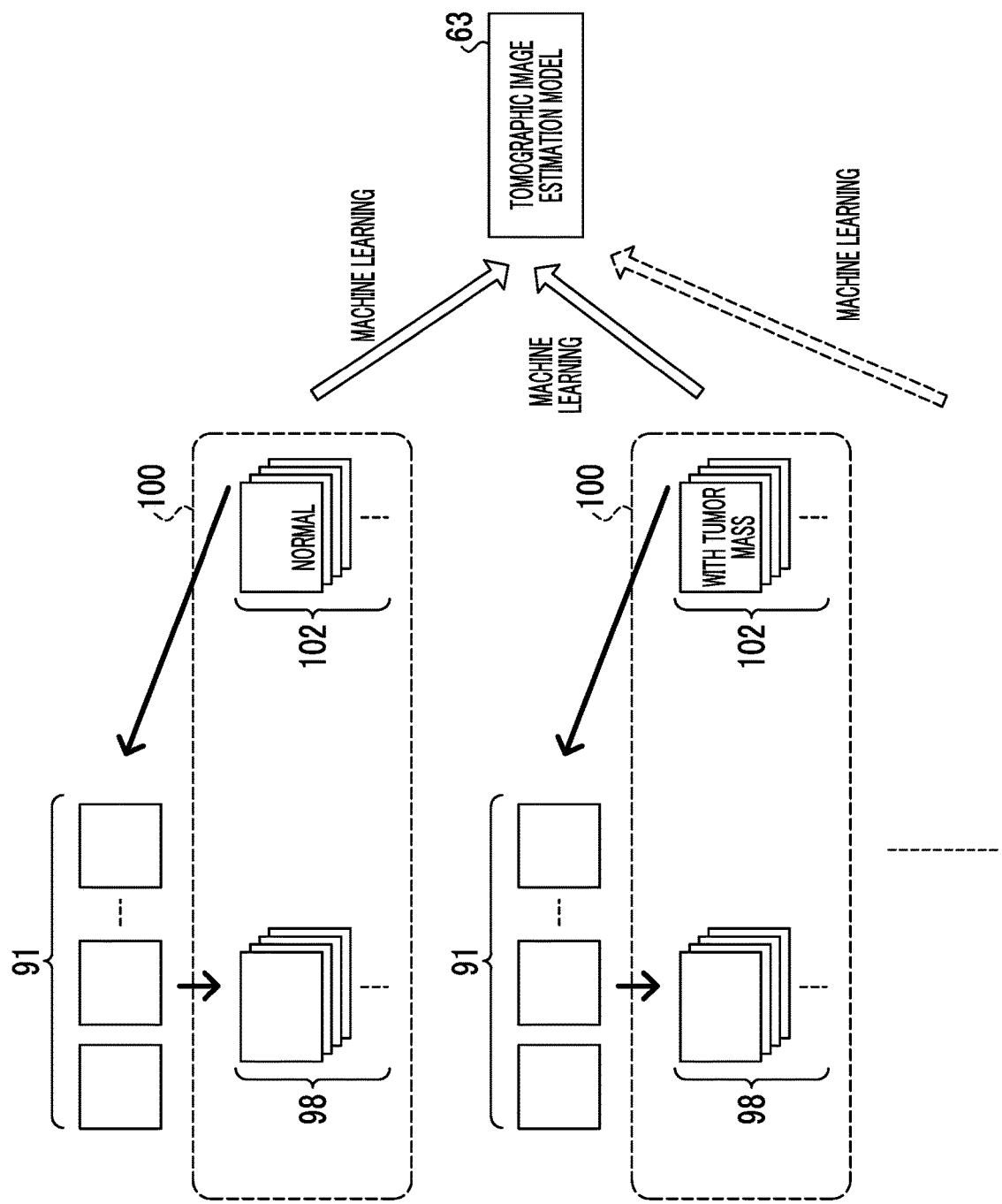
FIG. 8 is a diagram illustrating an example of training of the tomographic image estimation model using a plurality of learning data items.

Further, as illustrated in FIG. 8, a plurality of learning data items 100 are used to train the tomographic image estimation model 63. Therefore, in the support device 14 according to this embodiment, a plurality of learning data items 100 are prepared by the three-dimensional data acquisition unit 80, the virtual projection image generation unit 82, the virtual tomographic image group generation unit 83, and the tomographic image estimation model generation unit 84. The correct answer data 102 constituting the learning data 100 is three-dimensional data in a case in which the breast to be subjected to the tomosynthesis imaging is assumed as the three-dimensional structure 110. Therefore, in this embodiment, the learning data 100 is composed of the correct answer data 102 which has the breasts in various states as the three-dimensional structure 110. For example, as illustrated in FIG. 8, a plurality of learning data items 100 including, for example, learning data 100 composed of a set of correct answer data 102, which has the breast in a so-called normal state in which no tumor mass or the like is present as the three-dimensional structure 110, and of the virtual tomographic image group 98, or learning data 100 composed of a set of correct answer data 102, which has the breast in a state in which a tumor mass is present as the three-dimensional structure 110, and of the virtual tomographic image group 98 are used for machine learning.

Further, the tomographic image estimation model generation unit 84 performs machine learning on the machine learning model using the learning data 100 to generate the tomographic image estimation model 63. As described above with reference to FIG. 6, the tomographic image estimation model generation unit 84 repeats a series of processes of the input of the virtual tomographic image group 98 of the learning data 100 to the tomographic image estimation model 63, the output of the estimated tomographic image group 92 from the tomographic image estimation model 63, the loss calculation based on the estimated tomographic image group 92 and the correct answer data 102, the setting of update, and the update of the tomographic image estimation model 63 to generate the tomographic image estimation model 63. For example, in the estimated tomographic image group 92 and the correct answer data 102 which is the correct answer tomographic images, the sum of the differences between the pixel values of the corresponding pixels of the tomographic images having the same tomographic plane height may be applied as the loss function in the loss calculation.

In addition, the slice thickness of the estimated tomographic image group 92 output from the tomographic image estimation model 63, that is, the height of the tomographic plane of each estimated tomographic image, can have any value. Further, it is preferable that the slice thickness of the estimated tomographic image group 92 is equal to the slice thickness of the correct answer tomographic images which are the correct answer data 102.

The tomographic image estimation model generation unit 84 stores the generated tomographic image estimation model 63 in the storage unit 62.

Next, the operation of the support device 14 according to this embodiment in the learning phase will be described with reference to FIG. 9. The CPU 60A executes the learning program 61 stored in the ROM 60B such that a learning process illustrated in FIG. 9 is performed.

Figure 9:
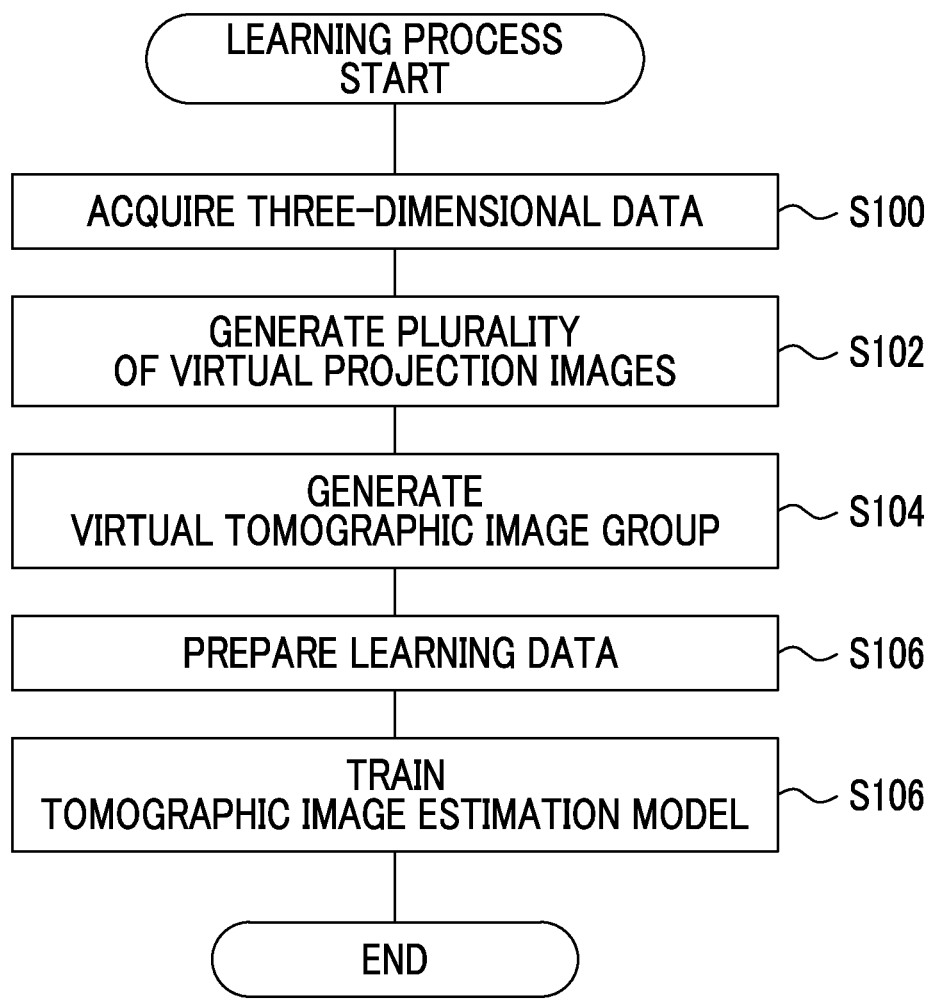
FIG. 9 is a flowchart illustrating an example of a flow of a learning process by the support device according to the embodiment.

In Step S100 of FIG. 9, the three-dimensional data acquisition unit 80 acquires the image data of the CT images as the three-dimensional data used as the correct answer data 102 as described above.

Then, in Step S102, the virtual projection image generation unit 82 generates a plurality of virtual projection images 91 using the three-dimensional data acquired in Step S100. As described above, the virtual projection image generation unit 82 performs pseudo-projection on the three-dimensional structure 110 with the radiation R at a plurality of virtual irradiation positions $19_i$ on the basis of the CT images acquired in Step S100, applying the above-described Expression (1), to generate a plurality of virtual projection images 91 onto which the three-dimensional structure 110 has been projected.

Then, in Step S104, the virtual tomographic image group generation unit 83 generates the virtual tomographic image group 98 from the plurality of virtual projection images 91 generated in Step S102. As described above, the virtual tomographic image group generation unit 83 generates the virtual tomographic image group 98 from the plurality of virtual projection images 91 generated in Step S102 at the plurality of virtual irradiation positions $19_r$, using a back projection method such as an FBP method or an iterative reconstruction method.

Then, in Step S106, the tomographic image estimation model generation unit 84 prepares a plurality of learning data items 100. As described above, the tomographic image estimation model generation unit 84 prepares a plurality of learning data items 100, each of which is a set of the correct answer data 102 obtained by correcting the CT images acquired in Step S100 and the virtual tomographic image group 98 generated in Step S104.

Then, in Step S108, the tomographic image estimation model generation unit 84 trains the tomographic image estimation model 63 using the learning data 100 prepared in Step S106. As described above, the tomographic image estimation model generation unit 84 repeats a series of processes of the input of the virtual tomographic image group 98 to the tomographic image estimation model 63, the output of the estimated tomographic image group 92, the loss calculation based on the estimated tomographic image group 92 and the correct answer data 102, the setting of update, and the update of the tomographic image estimation model 63 to train the tomographic image estimation model 63. The tomographic image estimation model generation unit 84 stores the trained tomographic image estimation model 63 in the storage unit 62. In a case in which the process in Step S108 ends, the image processing illustrated in FIG. 9 ends.

The tomographic image estimation model 63 generated by the learning phase of the support device 14 as described above is used in an operation phase of the image processing performed by the console 12.

Further, as illustrated in FIG. 3, the console 12 according to this embodiment has a function of controlling the mammography apparatus 10 using, for example, an imaging order and various kinds of information acquired from a radiology information system (RIS) through a wireless communication local area network (LAN) and instructions input by the user through an operation unit 56 or the like.

For example, the console 12 according to this embodiment is a server computer. As illustrated in FIG. 3, the console 12 comprises a control unit 50, a storage unit 52, the I/F unit 54, the operation unit 56, and a display unit 58. The control unit 50, the storage unit 52, the I/F unit 54, the operation unit 56, and the display unit 58 are connected to each other through a bus 59, such as a system bus or a control bus, such that they can transmit and receive various kinds of information.

The control unit 50 according to this embodiment controls the overall operation of the console 12. The control unit 50 comprises a CPU 50A, a ROM 50B, and a RAM 50C. Various programs including an image generation program 51 executed by the CPU 50A are stored in the ROM 50B in advance. The RAM 50C temporarily stores various kinds of data. The console 12 according to this embodiment is an example of an image processing device according to the present disclosure, and the CPU 50A according to this embodiment is an example of a processor of the image processing device according to the present disclosure. In addition, the image generation program 51 according to this embodiment is an example of a learning program according to the present disclosure.

For example, the image data of the radiographic image captured by the mammography apparatus 10 and various other kinds of information are stored in the storage unit 52. A specific example of the storage unit 52 is an HDD, an SSD, or the like.

The operation unit 56 is used by the user to input, for example, instructions which are related to the capture of a radiographic image and which include an instruction to emit the radiation R or various kinds of information. The operation unit 56 is not particularly limited. Examples of the operation unit 56 include various switches, a touch panel, a touch pen, and a mouse. The display unit 58 displays various kinds of information. In addition, the operation unit 56 and the display unit 58 may be integrated into a touch panel display.

The I/F unit 54 transmits and receives various kinds of information to and from the mammography apparatus 10, the support device 14, the RIS, and the PACS using wireless communication or wired communication. In the radiography system 1 according to this embodiment, the console 12 receives the image data of the radiographic image captured by the mammography apparatus 10 from the mammography apparatus 10 through an I/F unit 54, using wireless communication or wired communication.

Figure 10:
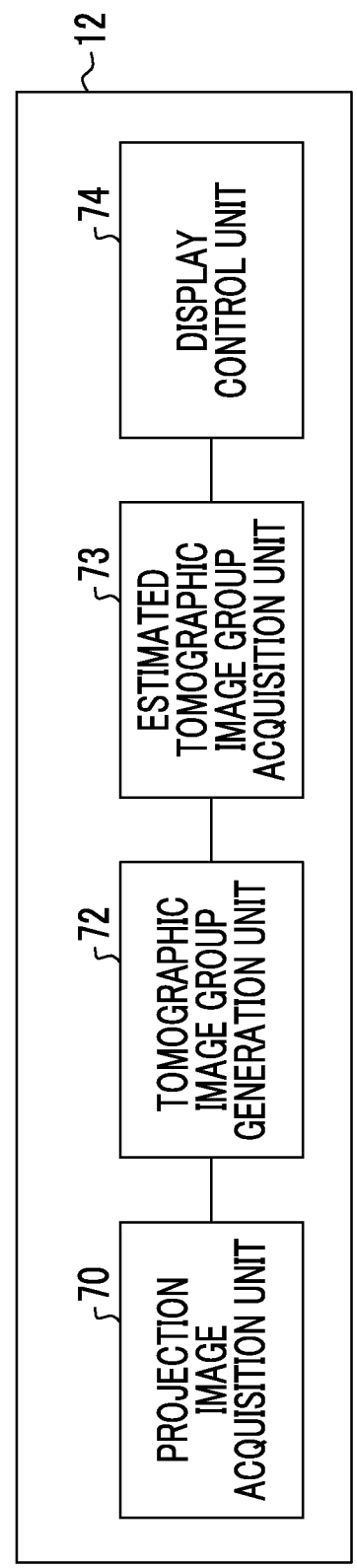
FIG. 10 is a functional block diagram illustrating an example of functions of the console according to the embodiment.

The console 12 according to this embodiment has a function of generating tomographic images from a plurality of projection images 90 using the tomographic image estimation model 63. FIG. 10 is a functional block diagram illustrating an example of a configuration related to the function of the console 12 according to this embodiment in generating the tomographic images from the plurality of projection images 90 using the tomographic image estimation model 63. As illustrated in FIG. 10, the console 12 comprises a projection image acquisition unit 70, a tomographic image group generation unit 72, an estimated tomographic image group acquisition unit 73, and a display control unit 74. For example, in the console 12 according to this embodiment, the CPU 50A of the control unit 50 executes the image generation program 51 stored in the ROM 50B to function as the projection image acquisition unit 70, the tomographic image group generation unit 72, the estimated tomographic image group acquisition unit 73, and the display control unit 74.

The projection image acquisition unit 70 has a function of acquiring a plurality of projection images 90. Specifically, the projection image acquisition unit 70 according to this embodiment acquires image data indicating a plurality of projection images 90 obtained by the tomosynthesis imaging in the mammography apparatus 10. The projection image acquisition unit 70 outputs the acquired image data indicating the plurality of projection images 90 to the tomographic image group generation unit 72.

The tomographic image group generation unit 72 has a function of generating the tomographic image group 96 indicating a plurality of tomographic planes of the object from the plurality of projection images 90 acquired by the projection image acquisition unit 70 on the basis of the plurality of irradiation positions $19_r$. A method by which the tomographic image group generation unit 72 generates the tomographic image group 96 is not particularly limited, and a known method can be used. For example, reconstruction may be performed by the back projection method, such as the FBP method or the iterative reconstruction method, and known techniques can be applied. In addition, a method by which the tomographic image group generation unit 72 generates the tomographic image group 96 may be the same as or different from the method by which the virtual tomographic image group generation unit 83 of the support device 14 generates the virtual tomographic image group 98. However, it is preferable that the methods are the same. The tomographic image group generation unit 72 outputs image data indicating the generated tomographic image group 96 to the estimated tomographic image group acquisition unit 73.

The estimated tomographic image group acquisition unit 73 has a function of acquiring the estimated tomographic image group 92 output from the tomographic image estimation model 63.

As illustrated in FIG. 4 described above, the estimated tomographic image group acquisition unit 73 inputs the tomographic image group 96 generated by the tomographic image group generation unit 72 to the tomographic image estimation model 63. Specifically, the tomographic image group generation unit 72 according to this embodiment outputs image data indicating the tomographic image group 96 to the support device 14 through the OF unit 54. In the support device 14, the tomographic image group 96 input from the console 12 is input to the tomographic image estimation model 63. As illustrated in FIG. 4, the tomographic image estimation model 63 outputs the estimated tomographic image group 92 according to the input tomographic image group 96. The estimated tomographic image group acquisition unit 73 acquires image data indicating the estimated tomographic image group 92 output from the tomographic image estimation model 63 of the support device 14 through the I/F unit 64 and the I/F unit 54.

The estimated tomographic image group acquisition unit 73 outputs the acquired image data indicating the estimated tomographic image group 92 to the display control unit 74.

The display control unit 74 has a function of displaying the estimated tomographic image group 92 acquired by the estimated tomographic image group acquisition unit 73 on the display unit 58. In addition, the display destination of the estimated tomographic image group 92 is not limited to the display unit 58. For example, the display destination may be an image reading device or the like outside the radiography system 1.

Next, the operation of the console 12 according to this embodiment in the operation phase will be described with reference to FIG. 11. For example, in a case in which the tomosynthesis imaging ends, the mammography apparatus 10 according to this embodiment outputs image data of a plurality of captured projection images 90 to the console 12. The console 12 stores the image data of the plurality of projection images 90 input from the mammography apparatus 10 in the storage unit 52. The console 12 generates tomographic images using the plurality of projection images obtained by the tomosynthesis imaging and performs image processing illustrated in FIG. 11 in order to display the tomographic images on, for example, the display unit 58. The CPU 50A performs the image generation program 51 stored in the ROM 50B such that the image processing illustrated in FIG. 11 is performed.

In Step S200 of FIG. 11, the projection image acquisition unit 70 acquires a plurality of captured projection images 90 with which information indicating the irradiation positions $19_t$ are associated. As described above, the projection image acquisition unit 70 according to this embodiment acquires the image data of the plurality of projection images 90 from the storage unit 52.

Then, in Step S202, the tomographic image group generation unit 72 generates the tomographic image group 96 from the plurality of projection images 90 acquired in Step S200. As described above, the tomographic image group generation unit 72 according to this embodiment generates the tomographic image group 96 indicating a plurality of tomographic planes of the object from the plurality of projection images 90 acquired by the projection image acquisition unit 70 on the basis of the plurality of irradiation positions $19_t$.

Then, in Step S204, the estimated tomographic image group acquisition unit 73 inputs the tomographic image group 96 generated in Step S202 to the tomographic image estimation model 63 of the support device 14. As described above, the estimated tomographic image group acquisition unit 73 outputs image data indicating the tomographic image group 96 generated in Step S202 to the support device 14, and the tomographic image group 96 is input to the tomographic image estimation model 63 of the support device 14. As described above, the estimated tomographic image group 92 is output from the tomographic image estimation model 63 to which the tomographic image group 96 has been input.

Then, in Step S206, the estimated tomographic image group acquisition unit 73 acquires the estimated tomographic image group 92 output from the tomographic image estimation model 63 of the support device 14 as described above.

Then, in Step S208, the display control unit 74 displays the tomographic images in the estimated tomographic image group 92 generated in Step S206 on the display unit 58. In a case in which the process in Step S208 ends, the image processing illustrated in FIG. 11 ends.

As described above, the console 12 according to the above-described embodiment is an image processing device that executes the operation phase for processing a plurality of projection images 90 obtained by sequentially irradiating the object with the radiation R emitted at each of the irradiation positions $19_t$ having different irradiation angles. The console 12 comprises the CPU 50A. The CPU 50A acquires a plurality of projection images 90 and generates the tomographic image group 96 indicating a plurality of tomographic planes of the object from the plurality of projection images 90. The CPU 50A inputs the generated tomographic image group 96 to the tomographic image estimation model 63 and acquires the estimated tomographic image group 92 output from the tomographic image estimation model 63.

The support device 14 is a learning device that executes a learning phase for performing machine learning on the tomographic image estimation model 63. The support device 14 includes the CPU 60A. The CPU 60A performs pseudo-projection on the three-dimensional structure 110 with the radiation R at a plurality of virtual irradiation positions $19_{t'}$ using the three-dimensional data indicating the three-dimensional structure 110, to generate a plurality of virtual projection images 91 onto which the three-dimensional structure 110 has been projected. The CPU 60A generates the virtual tomographic image group 98 from the plurality of virtual projection images 91. The CPU 60A performs machine learning on the machine learning model, using the learning data 100 composed of a set of the correct answer data 102 which is the three-dimensional data and of the virtual tomographic image group 98, to generate the tomographic image estimation model 63 that receives the tomographic image group 96 as an input and outputs the estimated tomographic image group 92.

The irradiation angle range is limited for the tomographic images obtained by reconstructing the projection images 90 obtained by the mammography apparatus 10 using a back projection method, such as a filter back projection (FBP) method or an iterative reconstruction method. Therefore, for example, in some cases, the quality of the tomographic images is lower than that of the CT images generated by so-called complete sinograms in a state in which the limitation of the irradiation angle range is relaxed. In contrast, the console 12 according to the above-described embodiment generates tomographic images from the projection images 90 obtained by the tomosynthesis imaging, using the tomographic image estimation model 63 which has been subjected to machine learning using the learning data 100 composed of a set of the correct answer data 102 which is three-dimensional data and of the virtual tomographic image group 98 generated from a plurality of virtual projection images 91 obtained by performing pseudo projection on the basis of the correct answer data 102. Therefore, according to the above-described embodiment, high-quality tomographic images can be generated by the tomographic image estimation model 63 that has been trained by the learning data 100 corresponding to the projection images 90 obtained by the tomosynthesis imaging. That is, according to the above-described embodiment, high-quality tomographic images can be generated by the tomographic image estimation model 63 trained using the learning data 100 corresponding to a relatively small number of projection images 90.

In addition, in the above-described embodiment, the aspect in which the breast is applied as an example of the object according to the present disclosure has been described. However, the object is not limited to the breast. For example, the object may be a chest, an abdomen, or the like, and radiography apparatuses other than the mammography apparatus may be applied. Note that with the breast as the object, a relatively large amount of noise is superimposed on the projection images 90 obtained by the mammography apparatus 10. Therefore, as in the above-described embodiment, the virtual projection images 91 are used instead of the projection images 90 actually obtained by the mammography apparatus 10, and the virtual tomographic image group 98 generated from the virtual projection images 91 is used as the learning data 100, which makes it possible to generate the tomographic image estimation model 63 that outputs the high-quality estimated tomographic image group 92 with higher accuracy.

Further, in the above-described embodiment, the aspect in which the CT images are used as the three-dimensional data used as the correct answer data 102 has been described. However, the three-dimensional data used as the correct answer data 102 is not limited to the CT images and may be any three-dimensional data indicating the three-dimensional structure 110 of the object. For example, three-dimensional data obtained by simulating the three-dimensional structure 110 of the object with a digital phantom may be used. The digital phantom is a numerical structure indicating an object that imitates a clinical anatomical structure of the object and is configured by disposing a structure having a pixel value corresponding to the absorption coefficient of the radiation R in a three-dimensional space. For example, similarly to the CT image, image data indicating an image having a pixel value corresponding to the dose of the radiation that reaches the radiation detector 20 can be applied as the three-dimensional data using the digital phantom. Further, a plurality of correct answer data items 102 used as the learning data 100 may include a plurality of types of three-dimensional data or may include, for example, three-dimensional data using CT images and three-dimensional data obtained by the digital phantom.

Furthermore, in the above-described embodiment, the aspect in which, since the CT image looks different from a general radiographic image, an image obtained by correcting the CT image according to the absorption coefficient of the radiographic image is used as the correct answer data 102 has been described. However, the correct answer data 102 is not limited to this aspect. For example, the correct answer data 102 may be the CT image or may be three-dimensional data indicating the three-dimensional structure 110.

In addition, in the above-described embodiment, the aspect in which the support device 14 generates one type of tomographic image estimation model 63 has been described. However, the present disclosure is not limited to this aspect, and a plurality of types of tomographic image estimation models 63 may be generated. For example, since the appearance of the image differs greatly depending on the amount of mammary gland, the support device 14 may generate the tomographic image estimation model 63 for each mammary gland content or each mammary gland category. In this case, the support device 14 prepares a plurality of types of three-dimensional structures 110 having different mammary gland contents or mammary gland categories and performs machine learning, using the learning data 100 composed of a set of the correct answer data 102 and of the virtual tomographic image group 98 generated from the virtual projection images 91, to generate a plurality of types of tomographic image estimation models 63 corresponding to the mammary gland contents or the mammary gland categories for each type of three-dimensional structure 110.

Further, for example, the tomographic image estimation model 63 may be generated for each series of irradiation positions $19_r$. In this case, for example, the support device 14 generates the tomographic image estimation model 63 using the learning data 100 composed of a set of the virtual tomographic image group 98 generated from the virtual projection images 91 obtained at the virtual irradiation positions $19_r$, which are within an irradiation angle range of −30 degrees to +30 degrees and which are arranged at angular intervals of 5 degrees, and of the correct answer data 102. Furthermore, for example, the support device 14 generates the tomographic image estimation model 63 using the learning data 100 composed of a set of the virtual tomographic image group 98 generated from the virtual projection images 91 obtained at the virtual irradiation positions $19_r$, which are within an irradiation angle range of −30 degrees to +30 degrees and are arranged at angular intervals of 3 degrees, and the correct answer data 102. Furthermore, for example, the support device 14 generates the tomographic image estimation model 63 using the learning data 100 composed of a set of the virtual tomographic image group 98 generated from the virtual projection images 91 obtained at the virtual irradiation positions $19_r$, which are within an irradiation angle range of −15 degrees to +15 degrees and are arranged at angular intervals of 5 degrees, and the correct answer data 102. As described above, the support device 14 may generate a plurality of types of tomographic image estimation models 63 corresponding to the irradiation angle range or a plurality of irradiation positions $19_r$.

Further, for example, the support device 14 may generate a tomographic image estimation model 63 for a right breast and a tomographic image estimation model 63 for a left breast. In this case, the support device 14 can perform machine learning using only the learning data 100 composed of a set of the correct answer data 102 which corresponds to the three-dimensional structure 110 corresponding to the right breast and of the virtual tomographic image group 98 generated from the virtual projection images 91 to generate the tomographic image estimation model 63 for the right breast. Further, the support device 14 can perform machine learning using only the learning data 100 composed of a set of the correct answer data 102 which corresponds to the three-dimensional structure 110 corresponding to the left breast and of the virtual tomographic image group 98 generated from the virtual projection images 91 to generate the tomographic image estimation model 63 for the left breast.

Furthermore, in the above-described embodiment, the aspect in which the support device 14 is an example of the learning device that executes the learning phase and the console 12 is an example of the image processing device that executes the operation phase has been described. However, the devices that operate as the learning device and the image processing device are not limited to the support device 14 and the console 12. For example, one device may have the functions of the learning device and the image processing device. As a specific example, the console 12 may have the functions of the learning device that executes the learning phase and the image processing device that executes the operation phase. In addition, for example, the mammography apparatus 10, the support device 14, and an external device other than the console 12 may have some or all of the functions of the projection image acquisition unit 70, the tomographic image group generation unit 72, the estimated tomographic image group acquisition unit 73, and the display control unit 74 of the console 12. Further, for example, the mammography apparatus 10, the support device 14, and an external device other than the console 12 may have some or all of the functions of the three-dimensional data acquisition unit 80, the virtual projection image generation unit 82, the virtual tomographic image group generation unit 83, and the tomographic image estimation model generation unit 84 of the support device 14.

Furthermore, in the above-described embodiment, for example, the following various processors can be used as a hardware structure of processing units performing various processes, such as the projection image acquisition unit 70, the tomographic image group generation unit 72, the estimated tomographic image group acquisition unit 73, and the display control unit 74, and as a hardware structure of processing units performing various processes, such as the three-dimensional data acquisition unit 80, the virtual projection image generation unit 82, the virtual tomographic image group generation unit 83, and the tomographic image estimation model generation unit 84. The various processors include, for example, a programmable logic device (PLD), such as a field programmable gate array (FPGA), that is a processor whose circuit configuration can be changed after manufacture, and a dedicated electric circuit, such as an application specific integrated circuit (ASIC), that is a processor having a dedicated circuit configuration designed to perform a specific process, in addition to the CPU that is a general-purpose processor which executes software (programs) to function as various processing units as described above.

One processing unit may be configured by one of the various processors or a combination of two or more processors of the same type or different types (for example, a combination of a plurality of FPGAs or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as a hardware structure.

In addition, specifically, an electric circuit (circuitry) obtained by combining circuit elements, such as semiconductor elements, can be used as the hardware structure of the various processors.

Further, in the above-described embodiment, the aspect in which the imaging program 41 is stored (installed) in the ROM 40B in advance, the image generation program 51 is stored (installed) in the ROM 50B in advance, and the learning program 61 is stored (installed) in the ROM 60B in advance has been described. However, the present disclosure is not limited thereto. Each of the imaging program 41, the image generation program 51, and the learning program 61 may be recorded on a recording medium, such as a compact disc read only memory (CD-ROM), a digital versatile disc read only memory (DVD-ROM), or a universal serial bus (USB) memory, and then may be provided. Further, each of the imaging program 41, the image generation program 51, and the learning program 61 may be downloaded from an external device through a network.

What is claimed is:

1. An image processing device that processes a plurality of projection images obtained by sequentially irradiating an object with radiation at each of a plurality of irradiation positions having different irradiation angles, the image processing device comprising:
   at least one processor,
   wherein the processor acquires the plurality of projection images, generates a tomographic image group indicating a plurality of tomographic planes of the object from the plurality of projection images, inputs the generated tomographic image group to a tomographic image estimation model, which is a trained model generated by performing machine learning on a machine learning model using learning data composed of a set of correct answer data that is three-dimensional data indicating a three-dimensional structure and of a virtual tomographic image group generated from a plurality of virtual projection images, onto which the three-dimensional structure has been projected by performing pseudo-projection on the three-dimensional structure with the radiation at a plurality of virtual irradiation positions using the three-dimensional data, and which receives the tomographic image group as an input and outputs an estimated tomographic image group, and acquires the estimated tomographic image group output from the tomographic image estimation model.

2. The image processing device according to claim 1, wherein the three-dimensional data which is the correct answer data is image data indicating a plurality of correct answer tomographic images corresponding to different tomographic planes.

3. The image processing device according to claim 1, wherein the object is a breast.

4. A learning device comprising:
at least one processor,
wherein the processor performs pseudo-projection on a three-dimensional structure with radiation at a plurality of virtual irradiation positions, using three-dimensional data indicating the three-dimensional structure, to generate a plurality of virtual projection images onto which the three-dimensional structure has been projected, generates a virtual tomographic image group from the plurality of virtual projection images, and performs machine learning on a machine learning model, using learning data composed of a set of correct answer data which is the three-dimensional data and of the virtual tomographic image group, to generate a tomographic image estimation model that receives a tomographic image group as an input and outputs an estimated tomographic image group.

5. The learning device according to claim 4,
wherein the processor simulates attenuation of the radiation according to an absorption coefficient to generate the plurality of virtual projection images.

6. The learning device according to claim 4,
wherein the three-dimensional data which is the correct answer data is image data indicating a plurality of correct answer tomographic images corresponding to different tomographic planes.

7. The learning device according to claim 4,
wherein the processor gives a noise component corresponding to an arrival dose to a dose of the radiation assumed to reach a radiation detector, which generates projection images used to generate the tomographic images, to generate the plurality of virtual projection images.

8. The learning device according to claim 4,
wherein the processor generates the virtual tomographic image group from the plurality of virtual projection images using an FBP method or an iterative reconstruction method.

9. The learning device according to claim 4,
wherein the plurality of virtual irradiation positions are positions that simulate irradiation positions of the radiation in tomosynthesis imaging.

10. The learning device according to claim 4,
wherein the three-dimensional structure is a structure indicating a breast, and
the tomographic image group is generated from projection images obtained by imaging the breast as an object.

11. A radiography system comprising:
a radiation source that generates radiation;
a radiography apparatus that performs tomosynthesis imaging which irradiates an object with the radiation at each of a plurality of irradiation positions having different irradiation angles to capture projection images of the object at each of the irradiation positions; and
the image processing device according to claim 1.

12. An image processing method that is executed by a computer and that processes a plurality of projection images obtained by sequentially irradiating an object with radiation at each of a plurality of irradiation positions having different irradiation angles, the image processing method comprising:
acquiring the plurality of projection images;
generating a tomographic image group indicating a plurality of tomographic planes of the object from the plurality of projection images on the basis of the plurality of irradiation positions;
inputting the generated tomographic image group to a tomographic image estimation model, which is a trained model generated by performing machine learning on a machine learning model using learning data composed of a set of correct answer data that is three-dimensional data indicating a three-dimensional structure and of a virtual tomographic image group generated from a plurality of virtual projection images, onto which the three-dimensional structure has been projected by performing pseudo-projection on the three-dimensional structure with the radiation at a plurality of virtual irradiation positions using the three-dimensional data, and which receives the tomographic image group as an input and outputs an estimated tomographic image group; and
acquiring the estimated tomographic image group output from the tomographic image estimation model.

13. A learning method that is executed by a computer, the learning method comprising:
performing pseudo-projection on a three-dimensional structure with radiation at a plurality of virtual irradiation positions, using three-dimensional data indicating the three-dimensional structure, to generate a plurality of virtual projection images onto which the three-dimensional structure has been projected;
generating a virtual tomographic image group from the plurality of virtual projection images using the plurality of virtual projection positions; and
performing machine learning on a machine learning model, using learning data composed of a set of correct answer data which is the three-dimensional data and of the virtual tomographic image group, to generate a tomographic image estimation model that receives a tomographic image group as an input and outputs an estimated tomographic image group.

14. A non-transitory computer-readable storage medium storing an image processing program that processes a plurality of projection images obtained by sequentially irradiating an object with radiation at each of a plurality of irradiation positions having different irradiation angles, the image processing program causing a computer to perform a process comprising:
acquiring the plurality of projection images;
generating a tomographic image group indicating a plurality of tomographic planes of the object from the plurality of projection images;
inputting the generated tomographic image group to a tomographic image estimation model, which is a trained model generated by performing machine learning on a machine learning model using learning data composed of a set of correct answer data that is three-dimensional data indicating a three-dimensional structure and of a virtual tomographic image group generated from a plurality of virtual projection images, onto which the three-dimensional structure has been projected by performing pseudo-projection on the three-dimensional structure with the radiation at a plurality of virtual irradiation positions using the three-dimensional data, and which receives the tomographic image group as an input and outputs an estimated tomographic image group; and
acquiring the estimated tomographic image group output from the tomographic image estimation model.

15. A non-transitory computer-readable storage medium storing a learning program that causes a computer to perform a process comprising:
performing pseudo-projection on a three-dimensional structure with radiation at a plurality of virtual irradiation positions, using three-dimensional data indicating the three-dimensional structure, to generate a plurality of virtual projection images onto which the three-dimensional structure has been projected;
generating a virtual tomographic image group from the plurality of virtual projection images; and
performing machine learning on a machine learning model, using learning data composed of a set of correct answer data which is the three-dimensional data and of the virtual tomographic image group, to generate a tomographic image estimation model that receives a tomographic image group as an input and outputs an estimated tomographic image group.

\* \* \* \* \*